US008742883B2

(12) United States Patent  (10) Patent No.: US 8,742,883 B2
Pelkey et al.  (45) Date of Patent: Jun. 3, 2014

(54) METHOD AND SYSTEM FOR MONITORING OPERATION OF A DISPENSING SYSTEM

(75) Inventors: John Thomas Pelkey, St. Paul, MN (US); Robert Eugene May, Lakeville, MN (US); Ryan Jacob Urban, Mahtomedi, MN (US); Quang Van Dao, Eden Prairie, MN (US)

(73) Assignee: Ecolab USA Inc., Saint Paul, MN (US)

( * ) Notice: Subject to any disclaimer, the term of this patent is extended or adjusted under 35 U.S.C. 154(b) by 588 days.

(21) Appl. No.: 12/868,132

(22) Filed: Aug. 25, 2010

(65) Prior Publication Data

US 2012/0049999 A1 Mar. 1, 2012

(51) Int. Cl.
G05B 23/02 (2006.01)
G01F 1/00 (2006.01)
G01F 1/74 (2006.01)
G01F 7/00 (2006.01)

(52) U.S. Cl.
USPC ........... 340/3.1; 340/3.21; 340/3.3; 340/3.31; 340/3.32; 340/3.43; 73/861; 73/861.04; 73/195

(58) Field of Classification Search
None
See application file for complete search history.

(56) References Cited

U.S. PATENT DOCUMENTS

| 5,033,649 | A | * | 7/1991 | Copeland et al. | 222/132 |
|---|---|---|---|---|---|
| 5,392,827 | A | * | 2/1995 | Yasso et al. | 141/192 |
| 5,626,291 | A | | 5/1997 | Flinn et al. | |
| 5,801,282 | A | * | 9/1998 | Dassel et al. | 562/413 |
| 6,293,294 | B1 | | 9/2001 | Loeb et al. | |
| 6,599,277 | B2 | | 7/2003 | Neubert | |
| 6,619,318 | B2 | | 9/2003 | Dalhart et al. | |
| 6,698,297 | B2 | | 3/2004 | Gysling | |
| 6,749,027 | B1 | | 6/2004 | Crabtree et al. | |
| 6,792,637 | B2 | | 9/2004 | Reichold et al. | |
| 6,936,176 | B1 | | 8/2005 | Greene, III et al. | |
| 7,059,541 | B2 | | 6/2006 | Jensen et al. | |
| 7,487,795 | B2 | | 2/2009 | Sand | |
| 7,615,122 | B2 | | 11/2009 | Mehus et al. | |
| 2003/0126993 | A1 | * | 7/2003 | Lassota et al. | 99/279 |
| 2005/0058548 | A1 | | 3/2005 | Thomas et al. | |
| 2005/0173458 | A1 | * | 8/2005 | Hiranaga et al. | 222/263 |
| 2006/0210430 | A1 | * | 9/2006 | Lark et al. | 422/62 |

(Continued)

FOREIGN PATENT DOCUMENTS

JP 2002536254 A 10/2002
JP 2002540018 A 11/2002

(Continued)

OTHER PUBLICATIONS

English Translation of JP 2002-536254 A, Applicant: Samuel Durham et al., published Oct. 29, 2002 (21 pages).

(Continued)

*Primary Examiner* — George Bugg
*Assistant Examiner* — Renee Dorsey
(74) *Attorney, Agent, or Firm* — McKee, Voorhees & Sease, P.L.C.

(57) ABSTRACT

A method and system provides for monitoring, troubleshooting and acquiring diagnostics information from an aspirating dispensing system (10). The dispensing system (10) uses an aspirator (12) with a plurality of liquid inlet ports and a flow meter (30) connected in liquid communication with at least one of the liquid inlet ports and a liquid source. The system monitors, troubleshoots and acquires diagnostics information from one or more components of the dispensing system by monitoring operation of the flow meter (30).

23 Claims, 5 Drawing Sheets

(56) References Cited

U.S. PATENT DOCUMENTS

| | | |
|---|---|---|
| 2008/0173705 A1 | 7/2008 | Girard et al. |
| 2008/0190421 A1 | 8/2008 | Zitting |
| 2009/0178728 A1* | 7/2009 | Cochran et al. ............... 141/39 |
| 2010/0139782 A1* | 6/2010 | Deline et al. ............. 137/87.03 |
| 2010/0265788 A1* | 10/2010 | Kandiyeli et al. ............ 366/142 |
| 2011/0068199 A1* | 3/2011 | Blansit et al. ............... 239/340 |

FOREIGN PATENT DOCUMENTS

| | | |
|---|---|---|
| JP | 2003192096 A | 7/2003 |
| KR | 100194503 B1 | 6/1999 |
| WO | WO 2005/039290 A1 | 5/2005 |
| WO | WO 2008/083896 A1 | 7/2008 |
| WO | WO 2008/095109 A1 | 8/2008 |

OTHER PUBLICATIONS

English Translation of JP 2002-540018 A, Applicant: IMI Cornelius(UK) Ltd), published Nov. 26, 2002 (7 pages).

English Translation of JP 2003-192096 A, Applicant: Sapporo Breweries Ltd, published Jul. 9, 2003 (10 pages).

International Search Report, mailed on Apr. 25, 2012, Applicant: Ecolab USA Inc., Application No. PCT/IB2011/053701, filed Aug. 23, 2011 (10 pages).

* cited by examiner

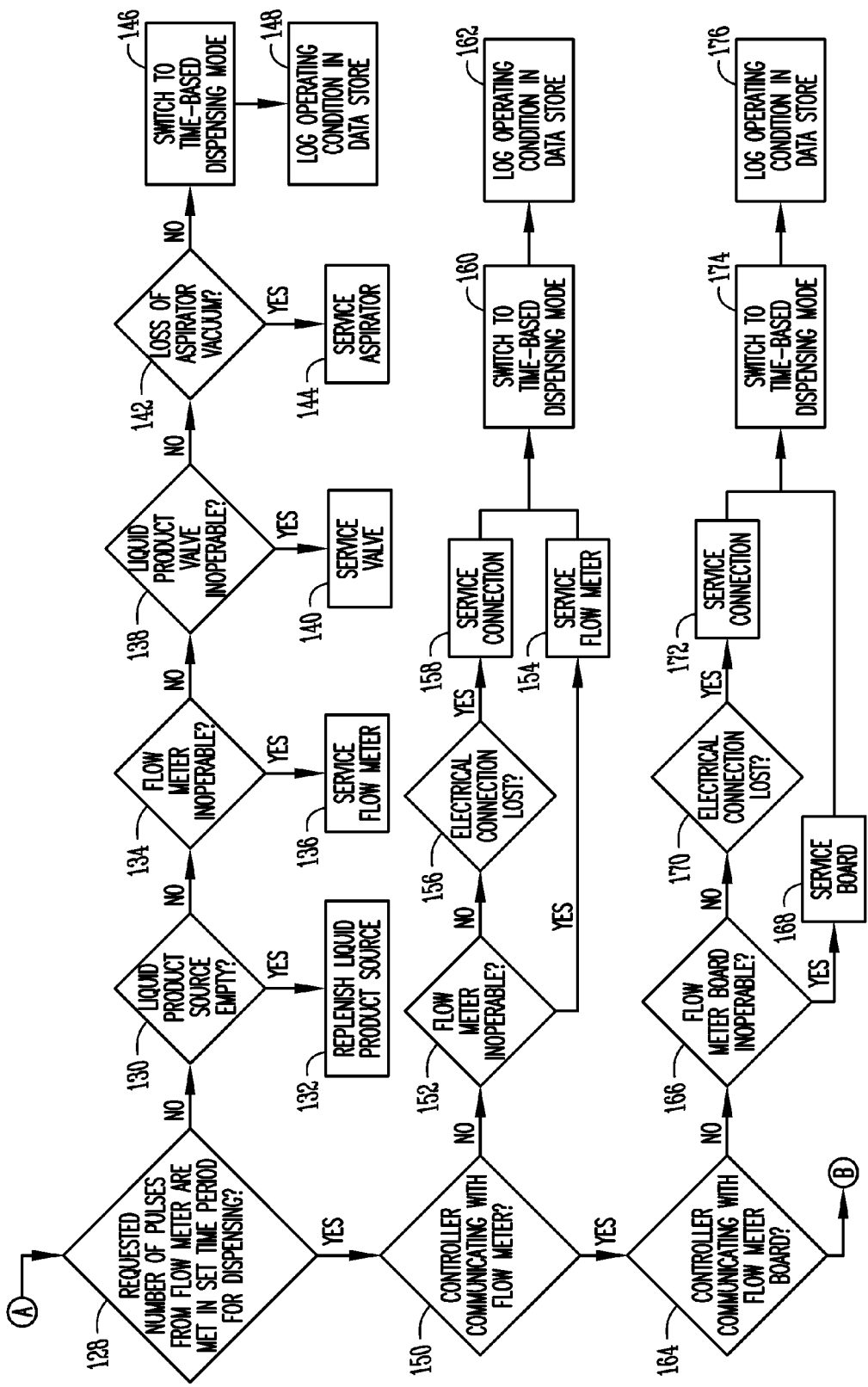

METHOD AND SYSTEM FOR MONITORING OPERATION OF A DISPENSING SYSTEM

BACKGROUND OF THE INVENTION

1. Field of the Invention

This invention relates generally to a method and system for monitoring operation of a dispensing system, and more particularly to a method and system for accurately diagnosing operation of a dispensing system for dispensing liquid products.

2. Description of Prior Art

Dispensing systems using aspirators to dispense product can be used in many cleaning and sanitizing processes, such as laundering, warewashing or the like. These processes vary from, on one hand, simply manually measuring and mixing to utilize in a computer-controlled dilution device. One common dilution mode involves utilizing a dispensing device that combines, under mixing conditions, a flow of concentrate and then a flow of diluent. The flow of liquid diluent can be directed through an aspirator such that, as the diluent passes through the aspirator, a negative pressure rises inside the aspirator drawing the liquids concentrate into the aspirator to mix with the liquid diluent. Both Copeland, et al., U.S. Pat. No. 5,003,649 and Freese, U.S. Pat. No. 4,817,825 and Mehus, et al., U.S. Pat. No. 5,915,592 disclose dispensers having aspirators for diluting liquid concentrates to produce liquid products in this general way. Such aspirator-type dispensers have been used for diluting and dispensing a liquid concentrate.

In a number of applications, there is a desire to supply a certain amount of liquid concentrate. In using a timing mechanism wherein the aqueous diluent is used for a certain amount of time, various amounts of concentrate may be dispensed depending upon the pressure of the liquid diluent and/or the viscosity of the liquid concentrate.

Given the range in viscosity of varying formulated liquid products, and the change that can result in viscosity due to the conditions uncontrollable by the manufacturer, such as temperature of the use location and pressure of the aqueous diluent used for dispensing, problems can and do occur that result in too little or too much product being dispensed. Even situations may arise where no product is dispensed as a result of the product source being empty or the dispenser malfunctioning without notice to an operator. There are numerous parameters and conditions that effect the dilution of liquid products that are dispensed by an aspirating dispenser.

To address these problems, U.S. application Ser. No. 12/862,990 disclosed a method, apparatus and system for accurately measuring and calibrating liquid components dispensed from a dispenser independent of the viscosity of the aqueous liquid product or the pressure of the source of the liquid diluent by using a flow meter in combination with an aspirating dispenser.

Before the invention of U.S. application Ser. No. 12/862,990, troubleshooting aspirating dispensers was typically accomplished by a guess and check method; an expense most companies are not willing to bear. With little diagnostics information to work with, operators and service technicians could spend hours and even days troubleshooting a dispensing system.

The present invention addresses these problems and provides a method and system for monitoring, troubleshooting and acquiring diagnostics information from a dispensing system.

In addition, the present invention provides valuable and useful information, both historical and in real-time, about the state of the dispenser.

BRIEF SUMMARY OF THE INVENTION

In one embodiment, the invention is a method for monitoring operation of a dispensing system. The method includes providing a dispensing system having an aspirator with a plurality of liquid inlet ports and a flow meter connected in liquid communication with at least one of the liquid inlet ports and a liquid source. The dispensing system diagnostically assesses operation of one or more of the components of the dispensing system by monitoring operation of the flow meter. Monitoring operation of the flow meter, in one aspect of the invention, includes monitoring an output signal of flow meter for assessing operation of one or more components of the dispensing system. The output signal from the flow meter may be stored in a data store or monitored in real-time.

In another embodiment, the invention is a diagnostic system for monitoring operation of one or more liquid dispensing components of a liquid dispenser. The system has an aspirator with a plurality of liquid inlet ports and an outlet port. A flow meter is connected in liquid communication to at least one of the liquid inlet ports and a liquid source. The flow meter has an output signal. A controller is connected to receive the output signal of the flow meter to monitor and diagnostically assess operation of one or more liquid dispensing components of the dispenser.

BRIEF DESCRIPTION OF THE DRAWINGS

While the specification concludes with the claims particularly pointing out and distinctly claiming the invention, it is believed that the present invention will be better understood from the following description taken in conjunction with the accompanying drawings, and which:

FIG. 2A-D is a flow diagram of the present invention.

DETAILED DESCRIPTION OF THE PREFERRED EMBODIMENTS

Figure 1:
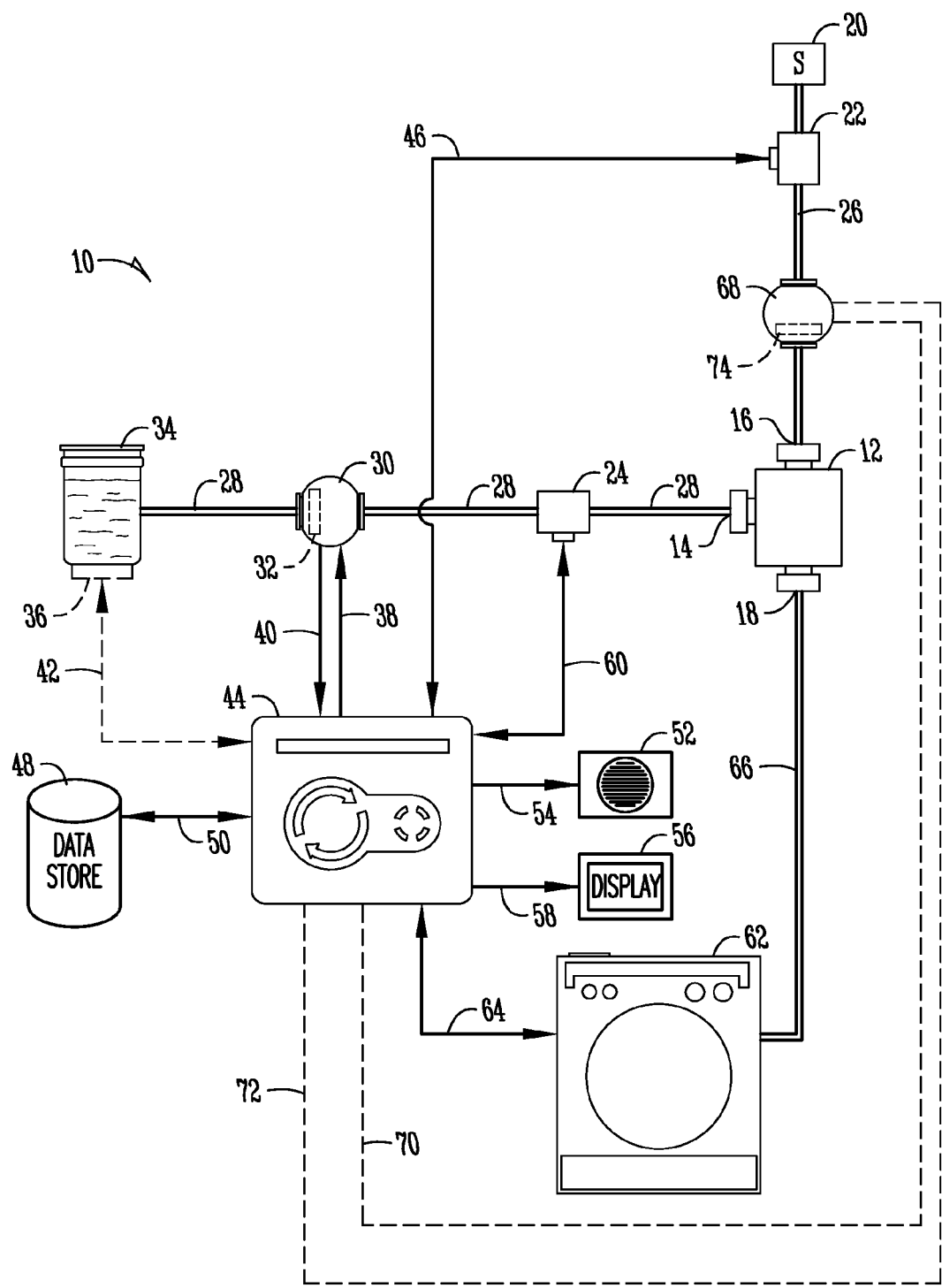
FIG. 1 is a schematic representation of the present invention.
Figure 2A:
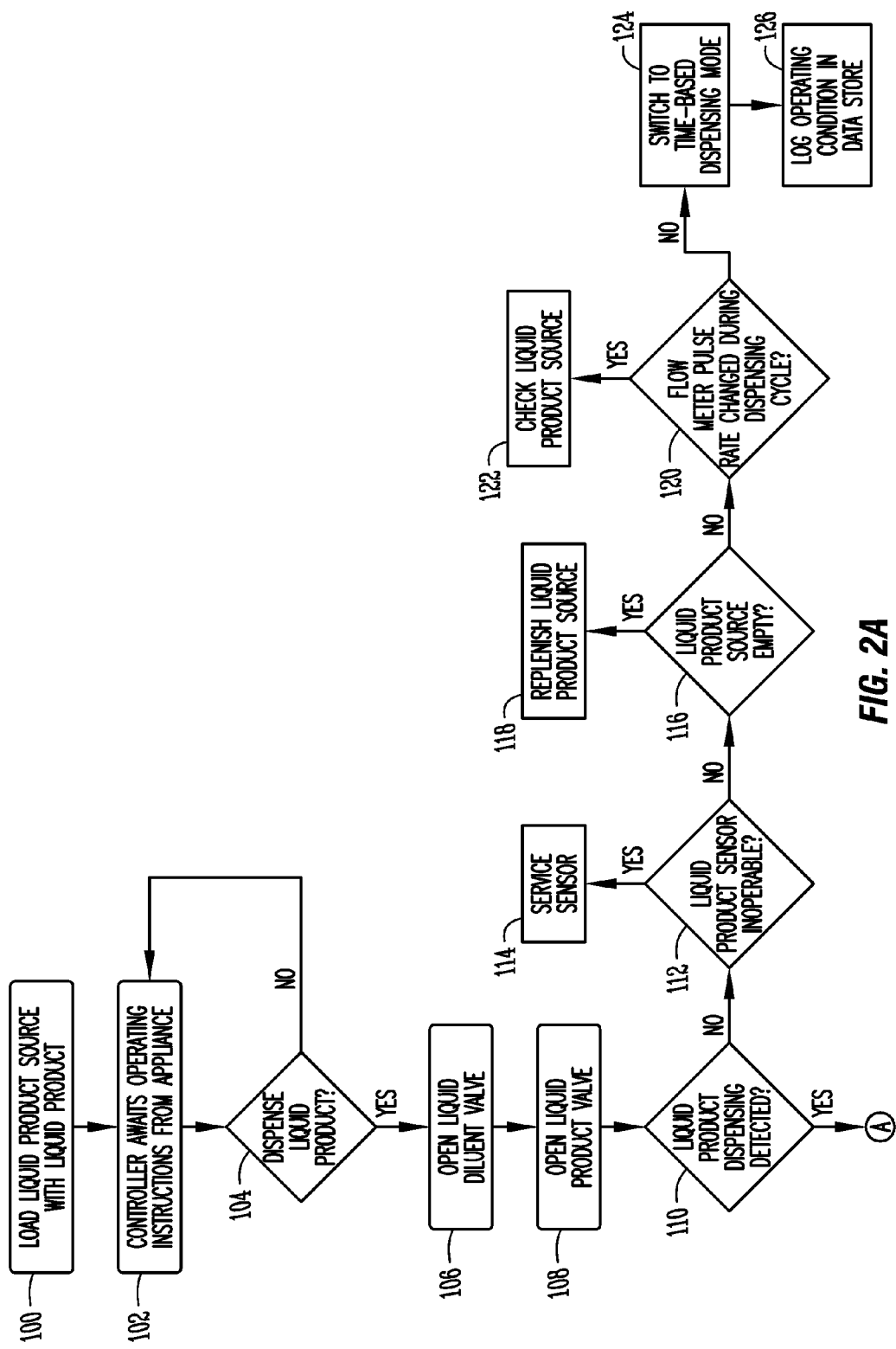
Figure 2C:
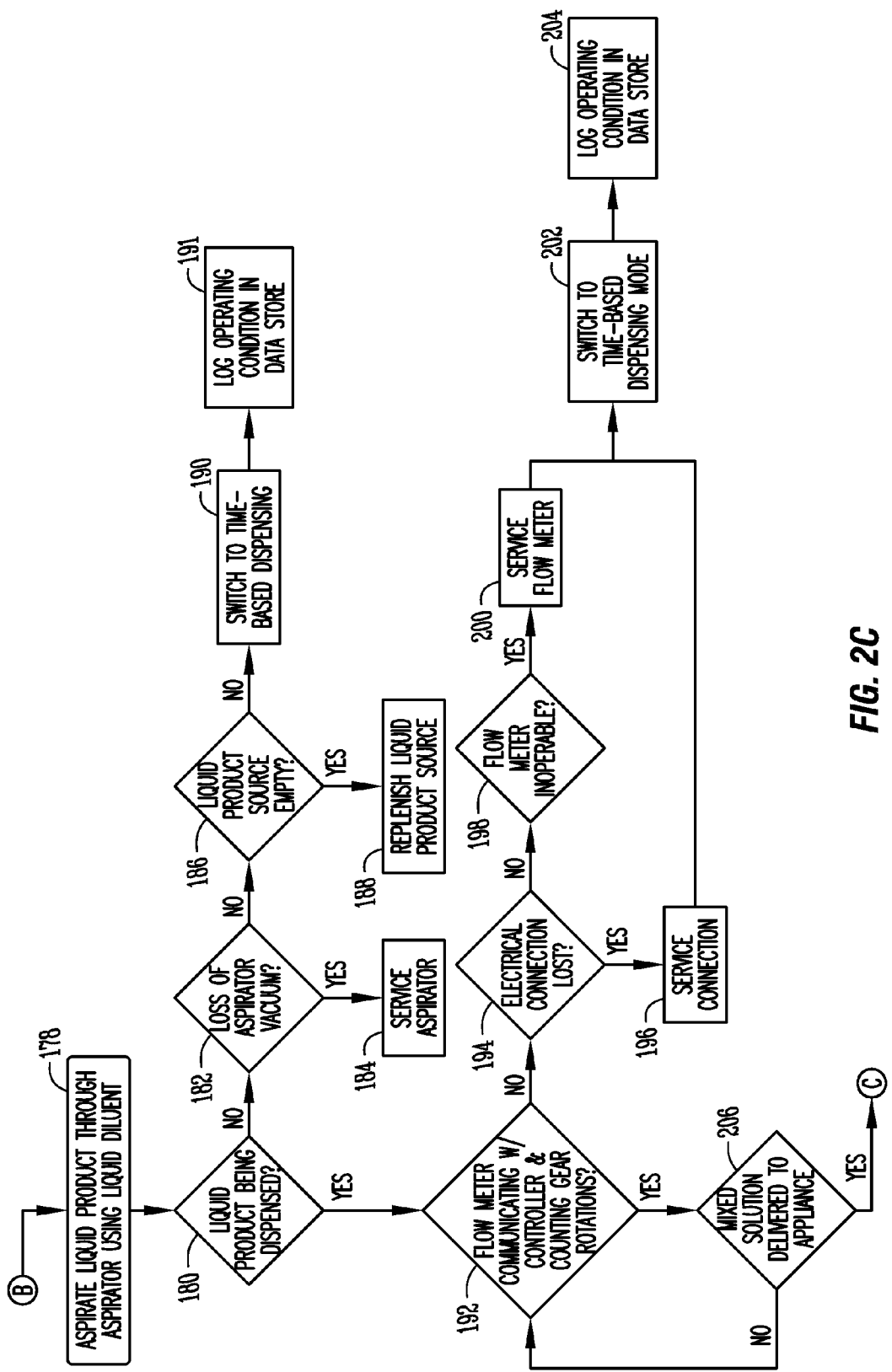
Figure 2D:
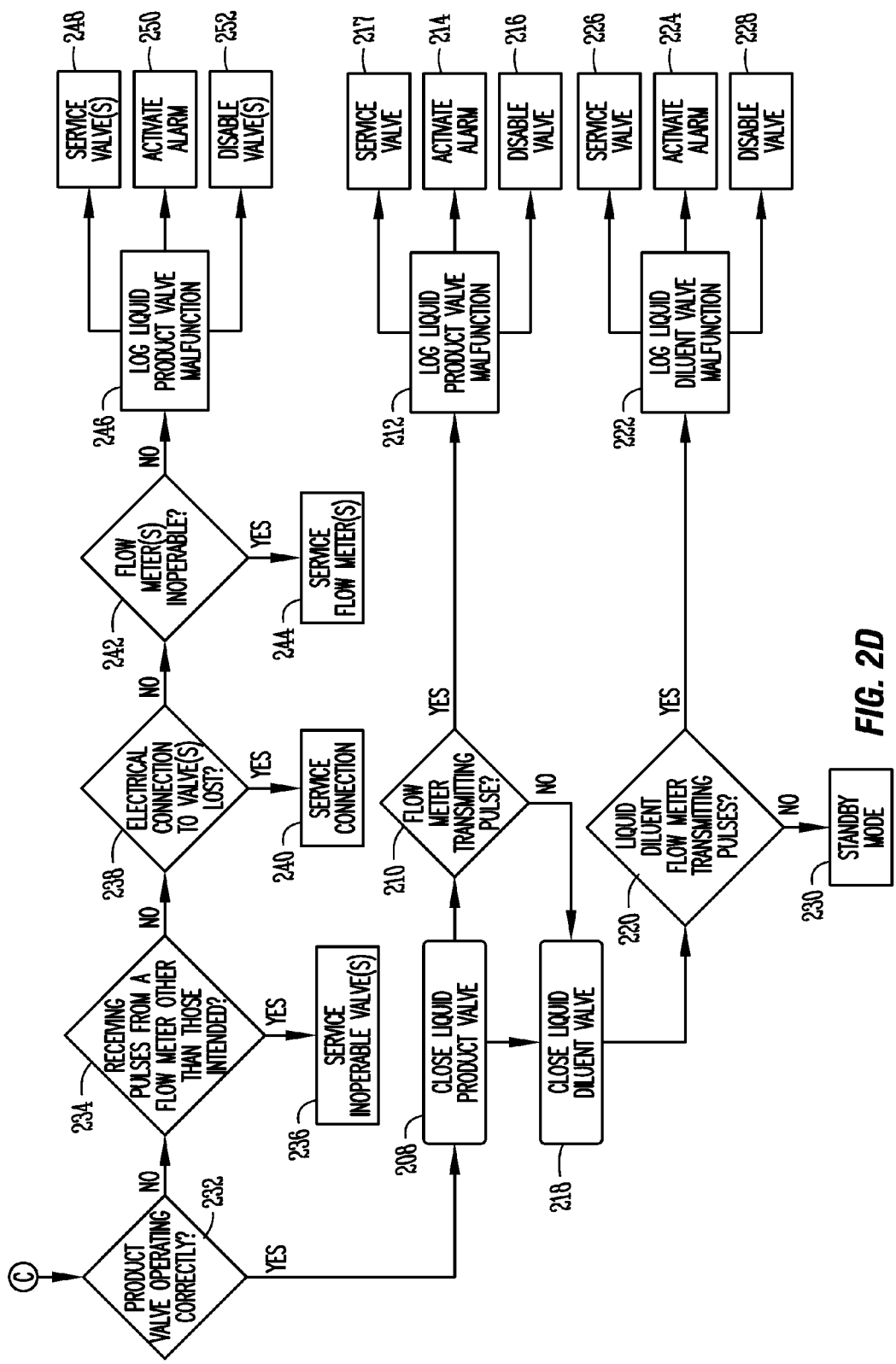

Referring to the drawings, wherein like numerals represent like parts throughout the several views, there is generally disclosed at 10 a dispensing system. The dispensing system includes an aspirator 12 having a plurality of product inlet ports 14. The aspirator 12 also includes a diluent inlet port 16 connected in fluid communication to a passageway within the body of the aspirator 12. The product inlet ports 14 are in fluid communication with the passageway within the body of the aspirator 12. The aspirator 12 includes an outlet port 18 through which a mixed solution is dispensed. The aspirator 12 may include a plurality of liquid product valves, such as an electronic solenoid valve. The liquid product valve 24 may be included as part of the aspirator 12 or configured separate from the aspirator as shown in FIG. 1. The liquid product valve 24 is connected in fluid communication to aspirator 12 via liquid product flow path 28. In the case where the valve 24 and aspirator 12 are included in the same assembly, the liquid flow path 28 is included within the body of the aspirator 12. Liquid product valve 24 is connected in electronic communication to controller 44. A liquid product valve signal 60 is communicated from controller 44 to liquid product valve 24 for operating the valve between open and closed positions. In the open position, liquid product source 34 is brought into open fluid communication with aspirator 12. A flow meter 30 is connected in fluid communication to valve 24 and aspirator 12 via liquid product flow path 28. Flow meter 30 is also connected in electronic communication with controller 44. The flow meter 30 receives an input signal 38 from controller 44 and outputs an output signal 40 to controller 44. Instructions, commands and other signals are communicated from controller 44 to flow meter 30 via the input signal pathway 38. Operational information, such as the number of pulses in the pulse rate of the flow meter 30 are communicated from flow meter 30 to controller 44 via output signal pathway 40. The flow meter 30 includes a flow meter electronics board 32 for controlling operation of the flow meter. The flow meter 30 and flow meter 68 are preferably in an oval gear meter, which is ideally suited for measurement of viscous fluids or those with varying viscosities. While an oval gear meter is preferred to be used with the present invention, it is understood that other suitable flow meters may be utilized. Other potentially suitable types of flow meters include an orifice-square edge, orifice-conic edge, venturi, pitot tube, electromagnetic, turbin, ultrasonic-transit time, doplar, rotometer, vortex or coriolis flow meter. A similar multi-port aspirator and flow meter combination is disclosed in application Ser. No. 12/862,990 entitled "Method, Apparatus and System for Accurately Measuring and Calibrating Liquid Components Dispensed from a Dispenser" filed on Aug. 25, 2010 and is hereby incorporated by reference in its entirety.

Each product inlet port 14 (and others not shown) is connected in fluid communication to a flow meter. The flow meter 30 is in-turn connected in fluid communication to a liquid product source 34 such as a liquid product container. As the aspirator 12 is configured with a plurality of product inlet ports 14, multiple liquid product sources may be connected in fluid communication to the aspirator 12. Each separate liquid product source 34 would be connected in fluid communication to the aspirator 12 by an independent liquid product flow path; each liquid product flow path would positioned within the flow path a flow meter such as illustrated in FIG. 1. Each liquid product source 34 is preferably configured with a liquid product sensor for monitoring an amount of the liquid product in a liquid product container. The liquid product sensor 36 is connected to communicate with controller 44. A liquid product sensor signal 42 is communicated from the liquid product sensor 36 to controller 44 for monitoring an amount of liquid product in the liquid product container.

Water from liquid diluent source 20, is delivered under a source pressure to the diluent inlet port 16 of aspirator 12. A liquid diluent valve 22 is placed in the liquid diluent flow path 26 and may be utilized to open and close the flow of liquid diluent through flow path 26. The liquid diluent valve 22 is connected electronically to controller 44. A liquid diluent valve signal 46 is communicated from controller 44 to liquid diluent valve 22 for operating the valve between open and closed positions.

In one aspect of the present invention, a flow meter 68 is placed in the liquid diluent flow path 26 and may be utilized to monitor the flow of liquid diluent from the liquid diluent source 20 into aspirator 12. The flow meter 68 has a flow meter board 74 connected in electronic communication with controller 44. The flow meter 68 receives an input signal 70 from the controller 44 and speaks with the controller via an output signal 72. Liquid diluent from source 20 and liquid product from liquid product source 34 are dispensed from aspirator 12 through outlet port 18 as a mixed solution to appliance 62 via mixed solution flow path 66.

As illustrated in FIG. 1, the controller 44 is also connected in electronic communication with a data store 48. Both historical and/or real-time data, such as diagnostics information, from the various components of the dispensing system 10 is communicated from controller 44 to data store 48 for subsequent retrieval and diagnosis of or troubleshooting of the system 10. Data is stored and retrieved from data store 48 by a data signal 50. Controller 44 is also connected in electronic communication with an electronic display 56. A display signal 58 is communicated from controller 44 to display 56 for displaying information to apprise an operator or technician of the status of the dispensing system 10. Also connected in electronic communication with controller 44 is a notification system 52. A notification signal 54 is communicated from controller 44 to notification system 52 for notifying an operator or technician about the status of the dispensing system 10. A controller 44 is also connected in electronic communication with the appliance 62. The controller 44 receives an operating signal 64 from appliance 62.

FIGS. 2A-D illustrate a flow diagram of the present invention. In operation, a liquid product container containing a liquid concentrate is loaded into the liquid product source 34 (see step 100). The dispensing system 10 remains in standby mode as the controller awaits operating instructions from appliance 62 at step 102. The operating instructions are sent from the appliance 62 to the controller 44 via appliance signal 64 to begin the dispensing process. If the controller 44 receives a dispense liquid product instruction at 104, the controller 44 issues a liquid diluent valve signal 46 to open liquid diluent valve 22 at step 106. In the case where no dispensed liquid product instruction is received from the appliance 62, the dispensing system 10 remains in the standby mode awaiting instructions. With the liquid diluent valve 22 in the open position, liquid diluent is communicated from liquid diluent source 20 through liquid diluent flow path 26 into aspirator 12. Liquid diluent communicated through liquid diluent flow path and into aspirator 12 is dispensed out of aspirator 12 through outlet port 18 to appliance 62 through mixed solution flow path 66. The controller 44 sends a product valve signal 60 to liquid product valve 24 to actuate the valve to an open position (see step 108). With the liquid product valve 24 in the open position, the liquid product source 34 is brought into fluid communication with aspirator 12. With the liquid product source 34 in fluid communication with the aspirator 12, liquid product may be aspirated from liquid product source 34 through liquid product flow path for dispensing out the outlet port 18 to the appliance 62 through the mixed solution flow path 66. As liquid product travels through flow meter 30 an output signal 40 comprising a number of pulses and/or pulse rate of the flow meter is communicated to controller 44. The controller 44 continually monitors operation of dispensing system 10 by monitoring, at least in part, flow meter 30. For example, the controller 44 performs one or more diagnostic checks as illustrated in FIGS. 2A-D. One diagnostic check performed by the controller is illustrated at step 110. In step 110, the controller monitors the dispensing system to identify if liquid product dispensing is detected. One way the system detects liquid product being dispensed is by monitoring the pulse rate change received via the output signal 40 from flow meter 30 (see step 120). Change in the frequency of the pulse rate is indicative of a change in the viscosity of the material being drawn through the flow meter 30. For example, the frequency of the pulse rate for a liquid product being drawn through flow meter 30 is different than the frequency of the pulse rate for air that is drawn through flow meter 30 when the liquid product source 34 is empty. As illustrated in step 120, the controller 44 queries (or monitors) to see if the flow meter pulse rate changes during dispensing cycle to detect liquid product dispensing. Furthermore, the controller 44 may be programmed to recognize the frequency or certain pulse rates for varying types of liquid product of varying viscosity. The controller may be programmed so that if a particular type of liquid product is being dispensed, the controller expects to receive a certain pulse rate from the flow meter 30. The pulse rate frequency associated with each liquid product may be stored in the controller with some variance to allow for slight changes in viscosity due to changes in pressure of the liquid diluent source 20 or changes in viscosity of the liquid diluent source 34 as a result of one or more changing operating conditions or parameters of the dispensing system 10. As a change in the frequency of the pulse rate received as an output signal 40 from flow meter 30 at controller 44 is indicative of the liquid product being out, confirmation of the liquid product being out may be detected by performing other checks as well. For example, the controller 44 may be configured to monitor the pulse rate of the flow meter in combination with the liquid product sensor signal 42 received from the liquid product source 34. In the case where the pulse rate received from the flow meter changes from the frequency of that associated with a liquid product to the frequency of that associated with air. The liquid product sensor signal 42 may be used to confirm that the liquid product container at the liquid product source is empty. At step 112 the controller 44 determines if the liquid product sensor is inoperable. In the case where the flow meter 30 determines that liquid product is no longer being aspirated and the liquid product sensor 36 does not signal the controller 44 that the liquid product container is empty, the liquid product sensor 36 may be determined to be inoperable and require service at step 114. In the case where the system determines that the liquid product source 34 is out of liquid product, the controller 44 may notify the operator via the display 56 or notification system 52 at step 116 that the liquid product source needs to be replenished (see step 118). The notification system 52 may apprise an operator or other by emitting an audible or tactile signal, or even a visual signal through display 56. If the system 10 determines that the any one of the events listed at steps 112, 116 or 120 have occurred, the controller may switch dispensing of liquid product from the liquid product source 34 to a time-based dispensing mode as illustrated at step 124. In the time-based dispensing mode, the controller leaves the liquid product valve 24 in the open position for a certain amount of time associated with the time required for the requested amount of liquid product to be dispensed. The controller logs this or any other conditions for service by a technician at step 126. If at step 110 it is determined that the liquid product source still has liquid product, the controller 44 ends this query and may perform a log of this condition in the form of a data signal communicated from the controller 44 to the data store 48.

Another way the dispensing system 10 diagnostically monitors operation of the various components of this system is to query whether the requested number of pulses from the flow meter are met within the set time period for dispensing as indicated at step 128. If it is determined that the number of requested pulses from the flow meter are not met within the specified time period, the controller 44 may determine that the liquid product is timed out. The controller may determine the potential source of this problem by investigating the following queries illustrated in steps 130, 134, 138 and 142. In one query, the controller 44 determines if the liquid product source is empty at step 130. This query can be accomplished by performing any one of the steps illustrated at 112, 116 and 120. If the controller 44 determines that the liquid product source is empty, an instruction is provided through the notification system 52 or display 56 to the user to replenish the liquid produce source (see step 132). Another query to determine why the requested number of pulses from the flow meter have not been met within the set time period is to determine if the flow meter is inoperable (see step 134). An input signal 38 received at the flow meter 30 from the controller 44 may be used to test the flow meter board 32 to make that it is communicating with the controller 44. If it is determined that the flow meter 30 is inoperable, the controller 44 may issue an instruction or notification signal through the notification system 52 or display 56 to an operator or technician that the flow meter requires service as illustrated at step 136. If the requested number of pulses from the flow meter are not met within a certain time period, the controller 44 may also diagnostically assess the liquid product valve to make sure it is operable (see step 138). A liquid product valve signal 60 may be sent from the controller 44 to the liquid product valve 24 to assess whether or not the valve is actuating between open and closed positions, or operating properly. If the liquid product valve 24 is determined to be inoperable, the controller 44 may issue a notification or alert signal to an operator or technician using the notification system 52 or display 56 that the valve requires service at step 140. Another potential query to identify the problem for why the number of requested pulses were not met during the time period is for the system to determine if a loss of aspirator vacuum has occurred, as shown at step 142. If the aspirator 12 is determined to have lost its vacuum, the controller 44 may issue a notification or alert to an operator or technician via the notification system 52 or display 56 to service the aspirator as shown at step 144. If the system is unable to identify the source of the problem for the requested number of pulses from the flow meter not being met within a certain time period, the controller 44 may switch over to a time-based dispensing mode at step 146 and log the operating condition in the data store 48 at step 148. The present invention contemplates that for each query the controller 44 may log the operating condition and/or response to the query within the data store 48 by providing to the data store a data signal 50 indicative of the result of the diagnostics query.

If it is determined that the requested number of pulses from the flow meter have been met within the set time period, the dispensing system 10 may perform other queries. For example, the controller 44 may diagnostically assess or determine the proper operation of the flow meter 30 by determining if the controller 44 is communicating with the flow meter 30 at step 150. This may be accomplished by receiving an input signal 38 at the flow meter board 32 from controller 44 and requesting an output signal 40 from the flow meter board 32 at the controller 44. If it is determined that the flow meter is inoperable (see step 152) the controller 44 may provide an alert or notification signal to the operator or technician via the notification system 52 or display 56 to request service of the flow meter at step 154. If the flow meter is determined to be operable, it may be determined by another query that electrical connection to the flow meter has been lost at step 156. If the electrical connection is lost, the controller 44 may communicate an alert or notification that the connection be serviced at step 158. In the case where the controller 44 is not able to communicate with the flow meter 30, the dispensing system 10 may be switched to a time-based dispensing mode at step 160 and the condition logged at step 162 in the data store 48. Similar to the above query, the controller 44 may determine that it is incapable of communicating with the flow meter board 32 of flow meter 30 (see step 164). If the controller 44 is unable to communicate with the flow meter board 32, the flow meter board may be inoperable (see step 166). If attempts by the controller 44 to communicate with the flow meter board 32 are not successful, the controller 44 may issue an alert or notification to an operator or technician to request service of the flow meter board 32 at step 168. If it is determined that the flow meter board 32 is operable but that electrical connection has been lost at step 170, the controller may issue a notification or alert to service the electrical connection at step 172. In the case where the controller 44 is unable to communicate with the flow meter board 32, the controller 44 may switch the dispensing system 10 to a time-based dispensing mode at step 174 and log the condition 176 in the data store 48. In the time-based dispensing mode, the liquid dispensing system continues to dispense liquid product from the liquid product source 34 through aspirator 12 to the appliance 62 until timed out by the controller 44. This will allow the appliance 62 to continue to receive liquid product while the dispensing system 10 is awaiting to be serviced.

If the controller determines that the liquid dispensing system has liquid product at the liquid product source 34 (see step 110), is meeting the requested number of pulses from the flow meter during a set time period at step 128, the controller is communicating with the flow meter at step 150, and the controller is communicating with the flow meter board at step 164, liquid product is dispensed from the liquid product source 34 through aspirator 12 and to appliance 62 via mixed solution flow path 66 (see step 178). The mixed solution comprises a portion of the diluent and liquid product. If during the dispensing cycle it is determined that liquid product is not dispensing at step 180, the controller 44 may determine that the aspirator 12 has lost vacuum at step 182. This could be determined by monitoring a vacuum pressure sensor (not shown) within the aspirator 12. In the case where the vacuum pressure sensor indicates that vacuum pressure has been lost to the aspirator, the controller 44 may issue an alert or notification to the operator or technician that the aspirator has lost vacuum and requires service (see step 184). If it is determined that the aspirator 12 has maintained vacuum, the controller may query the liquid product sensor to see if the liquid product source is empty at step 186. If it is determined that the liquid product source is empty, the controller 44 may issue an alert or notification signal via the notification system 52 or display 56 to apprise the operator or technician that the liquid product source 34 requires a new liquid product container (see step 188) Like other queries performed by the controller 44, these queries are logged in the data store at step 191. If the controller is unable to determine why liquid product is not dispensing, the controller 44 switches the dispensing system 10 to a time-based dispensing mode at step 190.

Dispensing system 10 may be configured to provide an operator or technician with a proof of dispense of liquid product to the appliance 62. This may be accomplished using the query at step 192 where the controller 44 determines if the flow meter 30 is communicating with controller 44 and counting the gear rotations of the flow meter (i.e., the pulse rate being received at the controller 44 from the flow meter board 32 of flow meter 30). If it is determined that communication is lost between the flow meter 30 and controller 44, the controller 44 may query the system to see if electrical connection has been lost at step 194. If electrical connection has been lost between the flow meter and controller, the controller 44 may issue a alert or notification that electrical service is required at step 196. The controller 44 may also query the flow meter 30 to determine if it is inoperable at step 198. If the flow meter 30 is determined to be inoperable, the system issues an alert or notification that the flow meter requires service at step 200. In the event it is determined that electrical connection has been maintained and that the flow meter is operable, the dispensing system 10 switches to a time-based dispensing mode at step 102 and the operating condition is logged at step 204 in the data store 48. The dispensing system 10 may also be used to confirm or prove that liquid product is being delivered to the appliance 62 through mixed solution flow path 66. This query may be accomplished by performing any one of the steps at 180, 182 or 186, alone or in combination with each other. Similarly, one or more sensors may be placed at the outlet of the mixed solution flow path 66 for monitoring the mixed solution being introduced into the appliance 62 to confirm or verify that liquid product is being dispensed.

During product dispensing or standby mode (see step 230) the system continually monitors each of the liquid product valves to ensure that each is operating correctly (see step 232). For example, during operation, one liquid product valve may receive instructions from the controller to move to an open position to permit a liquid product associated with the liquid product valve to dispense. To assess whether liquid product valves in the system are operating correctly the system monitors for pulses being received from a flow meter that should not be pulsing (see step 234). In the case where the system receives pulses from a flow meter that should not be pulsing the system could provide an alert to the operator/user that one or more inoperable valves need to be serviced (see step 236). In another instance, electrical connection could be lost to a liquid product valve associated with a flow meter that should or should not be pulsing (see step 238). If a flow meter is pulsing and should not be, this is indicative of liquid product flowing through the line even though it has not been requested. One reason for this malfunction could be the loss of electrical connection to the responsible valve as indicated at step 238, which can be repaired by servicing the electrical connection (see step 240). Another query that the system may look to inspect to determine if the liquid product valves are operating correctly (see step 232) is to monitor operation of each of the respective flow meters connected in fluid communication to each of the liquid product valves. For example, a liquid product valve may be operating correctly, but the flow meter associated with the liquid product valve may be pulsing and thereby indicating or suggesting that liquid product is traveling through the fluid lines when it shouldn't be. To determine if this is the case the system monitors the flow meters to make sure each one of them are operable (see step 242) and alerts an operator/user to service any inoperable flow meter (see step 244). If the system is not able to determine why a product valve is operating incorrectly, the system may log the malfunction (see step 246) and provide a notification to the operator/user to service the inoperable valve (see step 248), activate an alarm (see step 250), or disable one or more of the liquid product valves (see step 252).

If the controller 44 determines that mixed solution is being delivered to the appliance 62 (see step 206) and that the requested amount has been dispensed, the controller 44 issues a liquid product valve signal 62 to liquid product valve 24 to actuate it to a closed position at step 208. The controller 44, also subsequent to step 208 issues a liquid diluent valve signal 46 to actuate the liquid diluent valve 22 to the closed position (see step 218). The dispensing 10 may return to a stand-by mode until another operating instruction is received from appliance 62. The dispensing system whether in stand-by mode or in active mode may continually monitor any one or more of the components of the system. For example, the controller 44 may monitor the flow meter 30 to determine if the flow meter is transmitting pulses when the liquid product valve 24 is in the closed position (see step 210). If the controller 44 receives pulses from the flow meter 30 when the liquid product valve 24 is closed, the controller 44 may determine that the liquid product valve 24 is faulty or inoperable and log the liquid product valve malfunction at step 212 and/or activate an alarm at step 214 to notify or alert the operator or technician that liquid product valve 24 is inoperable or faulty. Furthermore, the controller 44 may issue a liquid product valve signal 62 to disable the flow meter 30 so as to prevent this dispensing leg of the dispensing system from operating.

In another aspect of the invention, a flow meter 68 may be included in the liquid diluent flow path 26 between the liquid diluent source 20 and diluent inlet port 16 of aspirator 12. The flow meter 68 may be used to monitor flow of liquid diluent from liquid diluent source 20 to aspirator 12. The flow meter 68 receives an input signal 70 from controller 44 and provides an output signal 72 to controller 44. The flow meter 68 includes a flow meter board 74 and operates similar to flow meter 30 discussed above. The flow meter 68 positioned in the liquid product flow path 28 may be monitored by controller 44 to make sure it is transmitting pulses when it should be and not transmitting pulses when it shouldn't (see step 220). For example, in the case where controller 44 issues a liquid diluent valve signal 46 to actuate the liquid diluent valve 22 to a closed position and the controller 44 continues to receive pulses from the flow meter 68, controller 44 may log the liquid diluent valve malfunction at step 222 and activate an alarm at step 224 to alert the operator or technician of the malfunction so the liquid diluent valve 22 can be serviced (see step 228). The controller 44 may also be configured to issue an instruction to the flow meter 68 to disable it to prevent operation of the system at step 226. When the dispensing system has completed a cycle, the dispensing system may return to a stand-by mode at step 230 and await further instructions from appliance 62. In this manner, the dispensing system 10 is able to monitor, troubleshoot and acquire diagnostics information about the dispensing system 10 before, during and after a dispensing cycle.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for monitoring operation of a dispensing system, comprising:
   providing a dispensing system having an aspirator with a plurality of liquid inlet ports and a flow meter connected in liquid communication with at least one of the liquid inlet ports and a liquid source;
   combining liquid product from the liquid source with a diluent from a diluent source at the aspirator;
   diagnostically assessing operation of one or more components of the dispensing system by monitoring operation of the flow meter;
   automatically switching the dispensing system from a flow-based dispensing mode to a time-based dispensing mode if one or more of the components of the dispensing system are determined to be inoperable or faulty; and
   providing feedback based upon the assessed operation of the one or more components.

2. The method of claim 1 wherein monitoring operation of the flow meter comprises monitoring an output signal of the flow meter for assessing operation of one or more components of the dispensing system.

3. The method of claim 2 further comprising the step of storing the output signal from the flow meter in a data store.

4. The method of claim 3 further comprising the step of outputting the stored data for analyzing, troubleshooting or ascertaining historical information about the dispensing system.

5. The method of claim 1 further comprising the step of issuing a notification signal for apprising an operator or user of the operational status of one or more of the components of the dispensing system.

6. The method of claim 1 wherein the one or more components of the dispensing system comprise one of:
   a. a valve;
   b. a liquid product source;
   c. a flow meter;
   d. an aspirator;
   e. a control board;
   f. a liquid diluent source.

7. The method of claim 1 in combination with an on-site formulator.

8. A method for monitoring operation of a dispensing system, comprising:
   providing a dispensing system having:
      a. an aspirator with a diluent inlet port, a product inlet port and a use solution outlet port;
      b. a flow meter connected in liquid communication with the product inlet port and a liquid product source;
   combining liquid product from the liquid product source with a diluent. from a diluent source at the aspirator;
   diagnostically assessing operation of one or more components of the dispensing system by monitoring an output signal of the flow meter;
   automatically switching the dispensing system from a flow-based dispensing mode to a time-based dispensing mode if one or more of the dispensing system are determined to be inoperable or faulty; and
   providing feedback based upon the assessed operation of the one or more components.

9. The method of claim 8 wherein diagnostically assessing operation of one or more components of the dispensing system comprises the step of determining a status of the liquid product source by detecting a change in the output signal.

10. The method of claim 8 wherein diagnostically assessing operation of one or more components of the dispensing system comprises the step of validating dispensing of a liquid product into the aspirator by monitoring the output signal.

11. The method of claim 8 wherein the dispensing system comprises a valve connected in liquid communication with the flow meter and the liquid product source.

12. The method of claim 11 wherein diagnostically assessing operation of one or more components of the dispensing system comprises the step of validating proper operation of the valve by monitoring the output signal.

13. The method of claim 8 wherein diagnostically assessing operation of one or more components of the dispensing system comprises the step of validating proper operation of the aspirator by monitoring the output signal.

14. The method of claim 8 wherein diagnostically assessing operation of one or more components of the dispensing system comprises the step of validating proper operation of the flow meter by monitoring the output signal.

15. The method of claim 8 further comprising the step of data logging the output signal for analyzing, troubleshooting or ascertaining historical information about the dispensing system.

16. The method of claim 8 in combination with a laundry system.

17. A diagnostics system for monitoring operation of one or more liquid dispensing components of a liquid dispenser, comprising:

an aspirator with a plurality of liquid inlet ports and an outlet port for receiving two or more liquids and combining them therein;

a flow meter connected in liquid communication to at least one of the liquid inlet ports and a liquid source, the flow meter having an output signal;

a controller connected to receive the output signal of the flow meter to monitor and diagnostically assess operation of one or more liquid dispensing components of the dispenser;

switching the dispensing system from a flow-based dispensing mode to a time-based dispensing mode if one or more of the components of the dispensing system are determined to be inoperable or faulty; and means for providing feedback based upon the output signal received by the controller.

18. The system of claim 17 wherein the one or more liquid dispensing components comprise a liquid product source connected in liquid communication with the flow meter, wherein the output signal of the flow meter provides an operational status of the liquid product source.

19. The system of claim 17 wherein the one or more liquid dispensing components comprise a valve connected in liquid communication with the flow meter, wherein the output signal of the flow meter provides an operational status of the valve.

20. The system of claim 17 wherein the output signal of the flow meter provides an operational status of the aspirator.

21. The system of claim 17 wherein the output signal of the flow meter provides an operational status of the flow meter.

22. The system of claim 17 further comprising a data store connected to receive the output signal of the flow meter for analyzing, troubleshooting or ascertaining historical information for one or more of the liquid dispensing components.

23. The system of claim 17 further comprising means for generating a notification signal for apprising an operator or user of the operational status of the one or more liquid dispensing components.

* * * * *